United States Patent [19]

Maytum

[11] 3,887,840

[45] June 3, 1975

[54] SELF-REGULATING LINE OUTPUT STAGE

[75] Inventor: Michael John Maytum, Buckden, England

[73] Assignee: Texas Instruments Incorporated, Dallas, Tex.

[22] Filed: Nov. 12, 1973

[21] Appl. No.: 415,085

[30] Foreign Application Priority Data

Nov. 24, 1972 United Kingdom .............. 54384/72

[52] U.S. Cl. .................................. 315/389; 315/411
[51] Int. Cl. ............................................. H01j 29/70
[58] Field of Search .......... 315/27 R, 27 TD, 28–29, 315/24, 25, 389, 411

[56] References Cited

UNITED STATES PATENTS

| | | | |
|---|---|---|---|
| 3,689,797 | 9/1972 | Hetterscheid et al. | 315/27 TD |
| 3,774,069 | 11/1973 | Yasumatsuya | 315/27 TD |
| 3,778,670 | 12/1973 | Nagai | 315/27 TD |
| 3,819,979 | 6/1974 | Truskalo | 315/29 |

*Primary Examiner*—Maynard R. Wilbur
*Assistant Examiner*—J. M. Potenza
*Attorney, Agent, or Firm*—Harold Levine; James T. Comfort; James O. Dixon

[57] ABSTRACT

Disclosed is a circuit powered from an unregulated voltage which generates television line scan deflection signals and a regulated voltage to power other circuits comprising a transistor with its input fed by variable width input pulses and its output transformer coupled to feed a storage capacitor for the regulated voltage resonant circuit including the deflection coils for scan generation, the transformer primary being connected to the collector of the transistor through a diode poled to block direct connection between the primary and secondary. Picture tube high voltage may be generated by an additional transformer secondary from the transistor or by inclusion of a transformer as part of the resonant circuit.

6 Claims, 9 Drawing Figures

SELF-REGULATING LINE OUTPUT STAGE

This invention relates to a transistor television line scan deflection circuit.

The greater reliability of transistors makes their employment in television receivers desirable, and because of the similarity between the methods of utilizing thermionic valves and transistors it has been normal practice to use transistors in basically similar circuits to those developed for thermionic valves, with such changes as are necessary to accommodate the alteration in the input and output impedances. In line scan deflection circuits the thermionic valve was employed as a switch to apply a substantially constant voltage to an inductor so that the current through the inductor rises linearly, this current being used to cause the line deflection in the display tube. At first transistor line output stages followed the design of thermionic valve output stages, so that stabilized power supplies were required to reduce the effects of the variations in the mains supply to the receiver on the size of the picture. Consideration was therefore given to the derivation of a line output stage capable of maintaining a substantially constant line scan output despite variations in the supply voltage. It has been proposed to achieve this result by feeding the line output stage from a current source rather than from a voltage source, so that modulation of the pulse width driving the transistor can be used to regulate the line scan output and consequently also the EHT generated. The circuit employed generated an HT (High Voltage) supply, which when fed back to control the drive pulse width, was stabilized and could be used for other circuits in the receiver. However, in the circuit proposed the HT supply was limited to a particular value depending on the supply voltage available to the transistor and for many applications this particular value of HT is not suitable. If the stabilized HT voltage available is too high, it can be reduced by the use of resistors or potentiometer at the cost of some power wastage and heat dissipation, which may not be acceptable. If the stabilized voltage level is too low, it cannot be used at all.

It is an object of the present invention to enable an HT supply voltage available from a transistor line output stage to be set to other values.

According to one example of the invention, there is provided a television line scan deflection circuit with deflection coils for a cathode ray tube, the circuit including a transistor, the collector of which is connected to a voltage supply through the primary winding of a transformer, and the emitter of which is connected to a reference potential, means for applying a rectangular waveform to the base of the transistor to render it alternately conducting and nonconducting, a conductor connected to the collector of the transistor through a first diode poled to pass current through the transistor when it is conducting, the conductor being connected separately through a resonant circuit and a second diode to the reference potential, the resonant circuit having inductive means including the deflection coils connecting the conductor to a storage capacitor connected to the reference potential and another capacitor connected from the conductor to the reference potential, and the second diode being poled so that current through it will also pass through the first diode; wherein the secondary winding of the transformer is connected in series with a third diode in a path from the reference potential to the storage capacitor to transfer to that capacitor the energy stored in the transformer whilst the transistor is conducting, and a fourth diode is connected between the primary winding of the first transformer and the collector electrode of the transistor to block connection of the primary and secondary windings of the transformer together through the first and third diodes.

According to a second example of the invention there is provided a television line scan deflection circuit with deflection coils for a cathode ray tube, the circuit including a transistor, the collector of which is connected to a voltage supply through the primary winding of a transformer, and the emitter of which is connected to a reference potential, means for applying a rectangular waveform to the base of the transistor to render it alternately conducting and nonconducting, a conductor connected to the collector of the transistor through a first diode poled to pass current through the transistor when it is conducting, the conductor being connected separately through a resonant circuit and a second diode to the reference potential, the resonant circuit having inductive means including the deflection coils connecting the conductor to a storage capacitor connected to the reference potential and another capacitor connected from the conductor to the reference potential, and the second diode being poled so that current through it will also pass through the first diode; wherein the secondary winding of the transformer is connected in series with a third diode in a path from the reference potential directly to the storage capacitor to transfer to that capacitor the energy stored in the transformer whilst the transistor is conducting.

The HT supply generated by the circuit appears across the storage capacitor, and can be fed back to the means for applying the rectangular waveform to the transistor to control the mark-to-space ratio of the rectangular waveform, and thereby regulate the HT supply voltage generated. If the transformer is a step-up transformer, that is to say it has a secondary winding with a greater number of turns than the primary winding, then the third diode is connected to the conductor so that the energy from the secondary winding reaches the storage capacitor through the inductive means of the resonant circuit transformer. On the other hand, if the transformer is a step-down transformer having a secondary winding with a smaller number of turns than the primary winding, then the third diode is connected directly to the second capacitor. In both circuits of this invention an EHT supply (Extra High Voltage) may be derived from a suitable secondary winding coupled either to the primary winding of the transformer or to a winding included in the inductive means of the resonant circuit.

In order that the invention may be fully understood and readily carried into effect, it will now be described with reference to the accompanying drawings, of which:

Figures 1, 2, 3, 4, 5, 6, 7, 8:
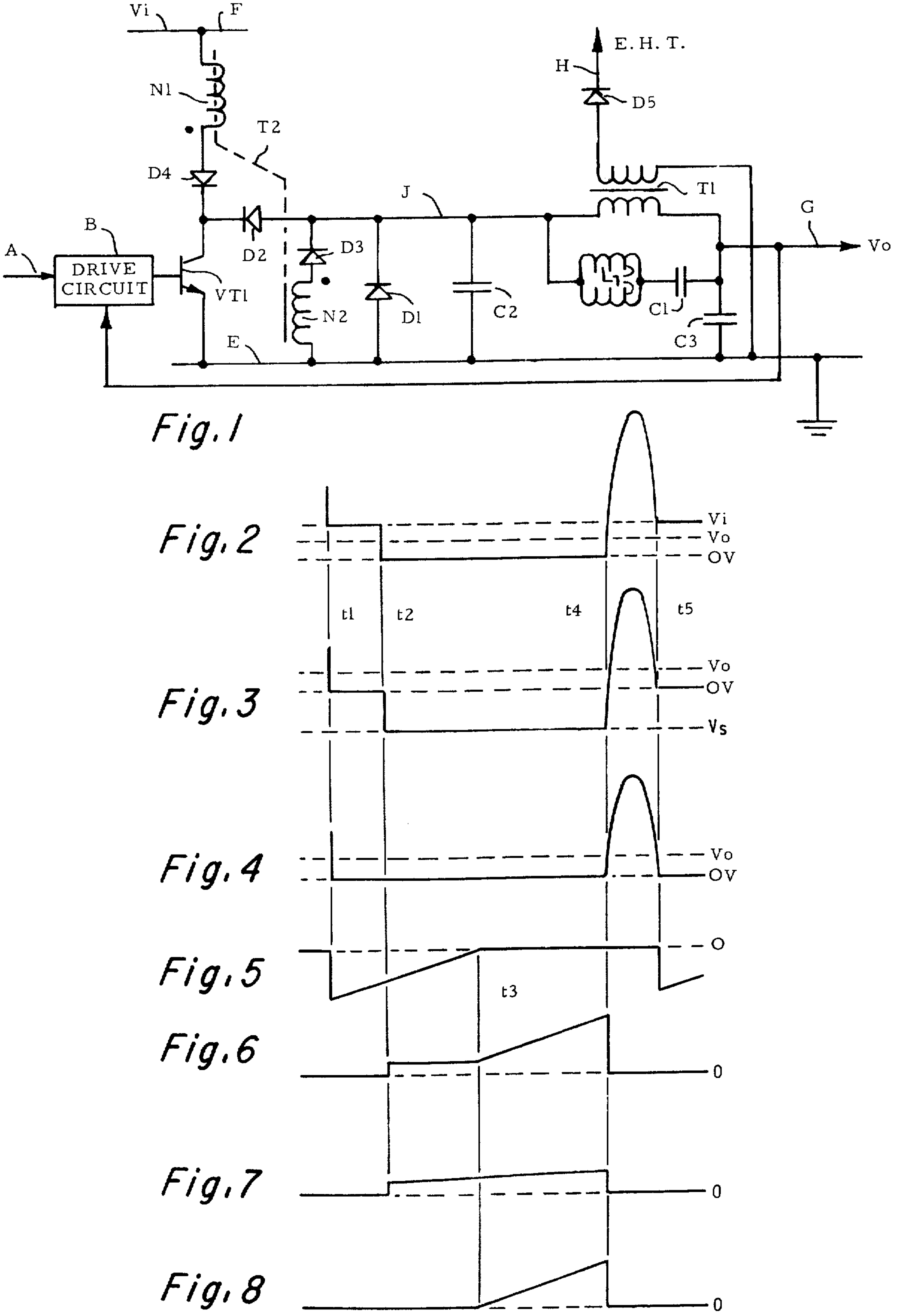
FIG. 1 is a diagram of one example of a circuit according to the invention.
FIGS. 2 to 8 represent waveforms occurring at various places in the circuit of FIG. 1.

Referring now to FIG. 1, a transistor VT1 is connected in grounded emitter configuration with its emitter electrode connected to a conductor E maintained at ground potential, although any other suitable reference potential could be used instead of ground. The base electrode of the transistor VT1 receives a rectangular waveform from a drive circuit B in response to synchronising pulses received on a conductor A. The collector electrode of the transistor VT1 is connected through a diode D4 and the primary winding N1 of a transformer T2 to a conductor F maintained at a voltage Vi relative to ground. The collector electrode is also connected through a diode D2 to a conductor J which is connected to the conductor E through several paths. A first path consists of diode D1 and a second path is formed by capacitor C2. A third path includes the primary winding of a transformer T1 connected in series with a capacitor C3, the primary winding being shunted by line deflection coils L1 in series with a capacitor C1; one electrode of the capacitor C3 is connected to the conductor E. The primary winding of the transformer T1 and the capacitors C2 and C3 together form a resonant circuit which executes a half cycle of oscillation during fly-back. The secondary winding N2 of the transformer T2 is connected between the conductor E and one electrode of a diode D3, the other electrode of which is connected to the conductor J. A conductor G which is connected to the junction of the primary winding of the transformer T1 and the capacitor C3, is joined to the drive circuit B to control the mark-to-space ratio of the rectangular waveform generated by that circuit. A stabilized HT voltage Vo is obtainable from the conductor G. The secondary winding of the transformer T1 is connected at one end to the conductor E and at its other end through a diode D5 to a conductor H at which an EHT voltage is generated.

FIG. 2 shows the voltage at the collector electrode of the transistor VT1.

FIG. 3 shows the voltage at the anode of the diode D3.

FIG. 4 shows the voltage at the cathode of the diode D1.

FIG. 5 shows the current through the diode D1.

FIG. 6 shows the collector current of the transistor VT1.

FIG. 7 shows the current through the primary winding N1 of the transformer T2.

FIG. 8 shows the current through the diode D2.

The waveforms shown in FIGS. 2 to 8 occupy just over one line scan period and are aligned with respect to time against which they are plotted. One line scan period extends from $t1$ to $t5$.

The operation of the circuit of FIG. 1 will now be described. The drive circuit B feeds a rectangular waveform to the base electrode of transistor VT1 so as to cause the transistor to become conducting at time $t2$ as shown in FIG. 6. At this time, the whole of the collector current of the transistor VT1 flows through the primary winding N1 and the diode D4 as indicated by FIG. 7. The transistor VT1 remains conducting until $t4$ when it is turned off again by the end of the rectangular drive pulse from the circuit B. Between $t2$ and $t4$ the current through the primary winding N1 of the transformer T2 rises slightly but steadily so that a certain amount of energy is stored in the transformer T2, which amount is dependent on the current flowing through the winding N1 when the transistor VT1 becomes nonconducting, and this current is in turn dependent on the length of time for which the transistor VT1 was conducting. When the transistor VT1 becomes nonconducting (at $t4$) the energy stored in the transformer T2 appears as a current from the secondary winding N2, and is conducted through the diode D3 to the conductor J. The winding N2 behaves as a current source and produces the current almost independent of the voltage at which it has to be produced, providing that the voltage is not too high; this voltage is shown in FIG. 3. The current is applied via the conductor J via the primary winding of the transformer T1, which together with the capacitors C2 and C3 forms the resonant circuit and undergoes a half cycle of oscillation when transistor VT1 becomes nonconducting, which oscillation is assisted by the current from winding N2. At $t4$, when the transistor VT1 is rendered nonconducting, a large current is flowing through the primary winding of the transformer T1, which generates a large voltage pulse on the conductor J, between $t4$ and $t5$, as shown in FIG. 4. This voltage pulse is of half sine wave form and lasts for the half cycle of oscillation of the resonant circuit. At the end of the half cycle of oscillation the current through the primary winding of transformer T1 has been reversed and the voltage across capacitor C2 falls to zero. As the voltage on the conductor J becomes negative under the influence of the current through the primary winding of transformer T1, the diode D1 becomes conducting, as shown in FIG. 5. At the time $t5$ (or $t1$) when the diode D1 starts to conduct, the energy in the resonant circuit is in the form of a current through the primary winding of the transformer T1 and this current, which falls linearly, flows through the diode D1 as shown in FIG. 5, reaching zero at time $t3$. Thus the diode D1 performs the function of an efficiency diode. The linear rise in current through the primary winding of the transformer T1 continues in response to the voltage stored in the capacitor C3, and this current flows through the diode D2 and the collector-emitter path of the transistor VT1, which is now conducting, having been switched on at $t2$ but not passing current until the voltage on conductor J tends to become positive (at $t3$). This current is shown in FIG. 8 between times $t3$ and $t4$ and produces a corresponding rise in the collector current of the transistor VT1 as shown in FIG. 6.

It will thus be apparent how a saw-tooth current waveform required for line deflection is generated through the primary winding of the transformer T1 and this is applied to the deflection coils L1 through the capacitor C1 in the usual way. The value of the capacitor C1 may be chosen to introduce a slightly S-shaped distortion of the linear rise so as to compensate for the nonlinearity of the scan due to the flatness of the c.r.t. screen and the wide scanning angle. The successive pulses generated by the secondary winding N2 of the transformer T2 build up a steady voltage Vo across the capacitor C3.

From a consideration of waveform of FIG. 6 it will be seen that the transistor VT1 becomes conducting at the time $t2$, which is before current is fed to it through the diode D2, which occurs at $t3$ when conductor J tends to become positive, so that the time of switching-on of the transistor VT1 can be varied between $t1$ and $t3$ without upsetting the action of the circuit. As shown in FIG. 7 the current through the primary winding N1 of the transformer T2 rises slowly whilst transistor VT1 is conducting, and as the energy stored in the transformer T2 depends upon the current flowing through the primary winding N1 when the transistor VT1 is switched off, it will be apparent that the energy transferred to the capacitor C3 from the transformer T2 by means of the secondary winding N2 will depend upon the timing of the time $t2$, or the pulse width from the drive circuit B. The connection from the conductor G to the drive circuit B enables the time of switching-on of the transistor VT1 to be varied so as to stabilize the voltage Vo.

The current output from the secondary winding N2 of the transformer T2 continues the whole time that the transistor VT1 is not conducting, that is to say from $t4$ to $t2$, so that some current is still being delivered between $t1$ and $t2$ when the efficiency diode D1 is conducting. When the transistor VT1 becomes conducting, there is a small residual amount of energy remaining in the transformer T2 and this results in an initial step in the current through the winding N1, as shown in FIG. 7 at $t2$.

Between $t4$ and $t5$ the conductor J has a high voltage pulse which is followed by the voltage across the winding N2. Windings N1 and N2 are coupled together because they are part of the transformer T2, so that a positive-going voltage pulse appears at the lower end of the winding N1, the amplitude of which pulse is (no. of turns of N1/no. of turns of N2) × amplitude of the pulse on winding N2. In order to obtain a high value for the voltage Vo it is necessary to provide the winding N2 with more turns than the winding N1, so that the voltage pulse across winding N2 is of larger amplitude than the voltage pulse across winding N1, with the result that the conductor J may go more positive than the lower end of winding N1 during the fly-back. The diode D4 is provided to ensure that the windings N1 and N2 do not become connected together through diodes D2 and D3 under these circumstances, which would otherwise lead to limitation of the pulse amplitudes and reduction in the scan amplitude or increase in power consumption. If the winding N2 has a number of turns equal to or less than the winding N1, the output voltage Vo on the conductor G will be restricted, because the winding N2 is unable to produce an output pulse of voltage high enough to drive current through the primary winding of transformer T1 against the voltage generated by the resonant return. One constraint on the voltage which can be generated by the winding N2 is removed by the provision of the diode D4, another such constraint is the limitation on the maximum collector voltage of the transistor VT1, which is alleviated by making the transformer T2 a step-up transformer.

Figure 9:
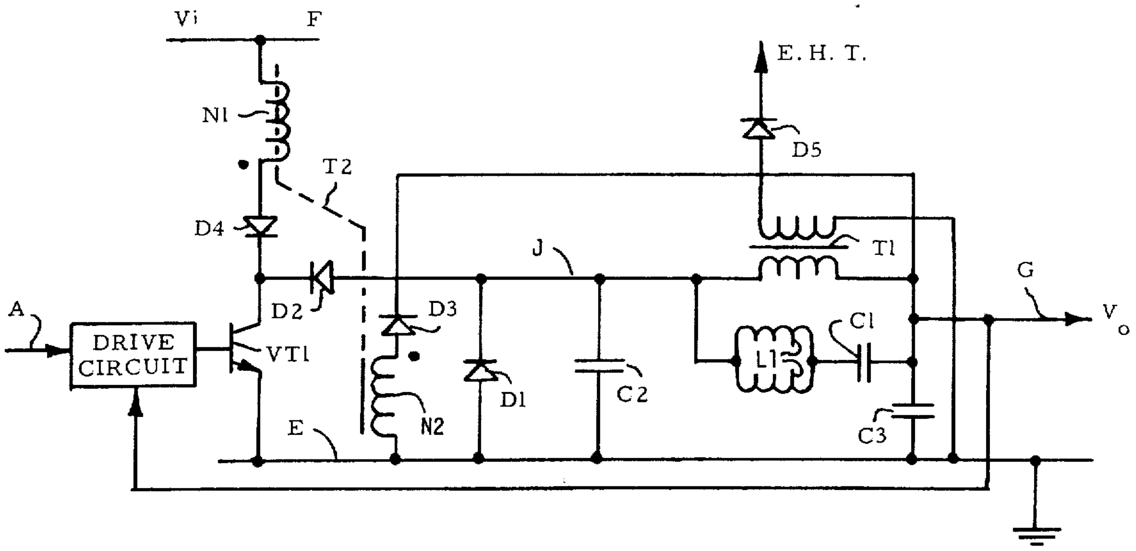
FIG. 9 is a diagram of a second example of a circuit according to the invention.

FIG. 9 shows another example of the invention which is particularly suitable for generating a stabilized output voltage Vo of lower value, say 40 volts, where the example of FIG. 1 could be used for generating an output Vo of 200 volts. The components of FIG. 9 are substantially the same as those of FIG. 1 and carry the same references. In FIG. 9, however, the transformer T2 is a step-down transformer so that the secondary winding N2 has fewer turns than the primary winding N1. FIG. 9 differs from FIG. 1 also in that the cathode of the diode D3 is connected to the capacitor C3 directly instead of to the conductor J. This change in the connection of the diode D3 has a far reaching effect on the voltage waveform from the winding N2, since this winding no longer has to overcome the opposing voltage which is generated during fly-back by the primary winding of transformer T1. The voltage waveform from the winding N2 in FIG. 9 is a rectangular wave, similar to that driving the base electrode of the transistor VT1, with a voltage Vo when the transistor VT1 is not conducting and a voltage of Vi × (no. of turns of winding N2/no. of turns of winding N1) when VT1 is conducting. An advantage brought about by this change is that the voltage Vo is controllable over a wider range than in FIG. 1, so that the circuit would be operable with a range of input voltage Vi exceeding two to one. The operation of FIG. 9 is similar to that of FIG. 1 except that the current from winding N2 does not flow through the primary winding of transformer T1.

Provided that the voltage Vo is sufficiently low the diode D4 can be omitted since the voltage at the collector of VT1 will always be more positive than that of the conductor during fly-back. The voltage on the collector of VT1 during fly-back is Vo × (no. of turns of winding N1/no. of turns of winding N2), unless this is exceeded by the voltage on the conductor J, so that the transistor VT1 has to withstand a slightly lower collector voltage in the circuit of the FIG. 9 than in the circuit of FIG. 1.

In both of the examples described above various modifications can be made. For example, the transformer T1 can be omitted together with the capacitor C3, so that the resonant circuit is formed by the deflection coils L1 and the capacitors C1 and C2. In this case the conductor G would be connected to the junction of the coils L1 and the capacitor C1 and one electrode of the capacitor C1, which may have a different value, would be connected to earth. Thus capacitor C1 would take over the function of capacitor C3. If EHT were required to be generated by this circuit it could be obtained from an additional winding on transformer T2.

Thus it can be seen that the present invention has the advantage over similar circuits of the prior art in allowing much greater design choice in the selection of the relative values of unstabilized power supply, stabilized voltage generated and the peak collector-to-emitter voltage rating of the transistor without the requirement of several additional components and useless power dissipation. This greater choice is achieved because of the isolation between the primary and secondary windings of transformer T2 by the action of diode D4.

What is claimed is:

1. A television combination circuit for generating a stabilized voltage for the operation of other circuits and line scan deflection signals for the deflection coils of a cathode ray tube, including a transistor, the collector of which is connected to a voltage supply through the primary winding of a transformer, and the emitter of which is connected to a reference potential, means for applying a rectangular waveform to the base of the transistor to render it alternately conducting and non-conducting, a conductor connected to the collector of the transistor through a first diode poled to pass current through the transistor when it is conducting, the conductor being connected separately through a resonant circuit and a second diode to the reference potential, the resonant circuit having inductive means including the deflection coils connecting the conductor to a storage capacitor connected to the reference potential and another capacitor connected from the conductor to the reference potential, and the second diode being poled so that current through it will also pass through the first diode; wherein the secondary winding of the transformer is connected in series with a third diode in a path from the reference potential to the storage capacitor to transfer to that capacitor the energy stored in the transformer while the transistor is conducting, and a fourth diode is connected between the primary winding of the first transformer and the collector electrode of the transistor to block connection of the primary and secondary windings of the transformer together through the first and third diodes.

2. A television combination circuit for generating a stabilized voltage for the operation of other circuits and line scan deflection signals for the deflection coils of a cathode ray tube, including a transistor, the collector of which is connected to a voltage supply through the primary winding of a transformer, and the emitter of which is connected to a reference potential, means for applying a rectangular waveform to the base of the transistor to render it alternately conducting and non-conducting, a conductor connected to the collector of the transistor through a first diode poled to pass current through the transistor when it is conducting, the conductor being connected separately through a resonant circuit and a second diode to the reference potential, the resonant circuit having inductive means including the deflection coils connecting the conductor to a storage capacitor connected to the reference potential and another capacitor connected from the conductor to the reference potential, and the second diode being poled so that current through it will also pass through the first diode; wherein the secondary winding of the transformer is connected in series with a third diode in a path from the reference potential directly to the storage capacitor to transfer to that capacitor the energy stored in the transformer whilst the transistor is conducting.

3. A circuit according to claim 1, wherein the secondary winding of the transformer has more turns than its primary winding.

4. A circuit according to claim 2, wherein the secondary winding of the transformer has fewer turns than its primary winding.

5. A circuit according to claim 1, in which the inductive means includes the primary winding of a second transformer, shunted by the deflection coils in series with a further capacitor, there being provided a secondary winding on the second transformer for generating E.H.T.

6. A circuit according to claim 2, in which the inductive means includes the primary winding of a second transformer, shunted by the deflection coils in series with a further capacitor, there being provided a secondary winding on the second transformer for generating E.H.T.

* * * * *